United States Patent [19]

Martin et al.

[11] 4,037,705
[45] July 26, 1977

[54] DESCENDER PRINTING SYSTEM FOR DOT MATRIX PRINTER

[75] Inventors: Donald P. Martin, Buffalo Grove; Richard G. Ryan, Elmhurst, both of Ill.

[73] Assignee: Extel Corporation, Northbrook, Ill.

[21] Appl. No.: 675,566

[22] Filed: Apr. 9, 1976

Related U.S. Application Data

[63] Continuation-in-part of Ser. No. 624,054, Oct. 20, 1975, Pat. No. 3,990,559.

[51] Int. Cl.² .......................... B41J 19/92; B41J 3/04
[52] U.S. Cl. .................................... 197/1 R; 197/72; 101/93.05
[58] Field of Search ............ 197/1 R, 72; 101/93.04, 101/93.05; 178/30

[56] References Cited

U.S. PATENT DOCUMENTS

| | | | |
|---|---|---|---|
| 3,627,096 | 12/1971 | Finnegan | 197/1 R |
| 3,687,256 | 8/1972 | Jones | 197/1 R |
| 3,759,359 | 9/1973 | Stellmach | 197/1 R |
| 3,789,969 | 2/1974 | Howard | 197/1 R |
| 3,893,558 | 7/1975 | Fulton et al. | 197/1 R |
| 3,935,938 | 2/1976 | Hodne | 197/1 R X |
| 3,973,662 | 8/1976 | Fulton | 197/1 R |

*Primary Examiner*—E. H. Eickholt
*Attorney, Agent, or Firm*—Kinzer, Plyer, Dorn & McEachran

[57] ABSTRACT

A descender printing system for a dot matrix printer, comprising a detector for detecting code words representative of descender characters (lower case letters, punctuation, fractions, etc.) prior to printing, and shift means for actuating the line feed mechanism of the printer to advance the paper by two or more dot heights and thereby print the descender elements of such characters below the normal base line. The shift means again actuates the line feed mechanism to return the paper to its original position when the next non-descender character is to be printed.

7 Claims, 5 Drawing Figures

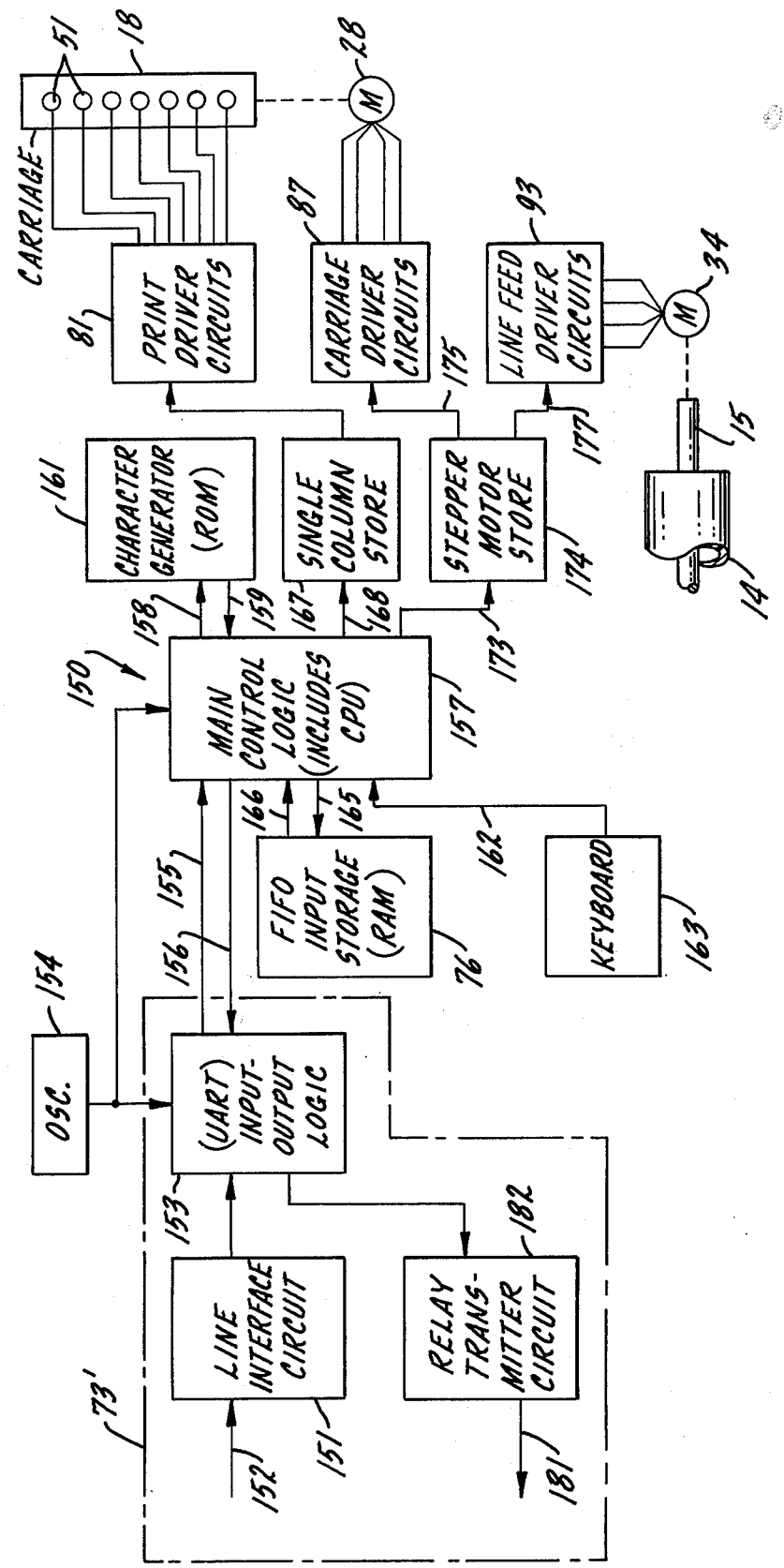

DESCENDER PRINTING SYSTEM FOR DOT MATRIX PRINTER

CROSS REFERENCE TO RELATED APPLICATION

This application is a continuation-in-part of application Ser. No. 624,054 filed Oct. 20, 1975, now U.S. Pat. No. 3,990,559.

BACKGROUND OF THE INVENTION

In a dot matrix printer, each character is reproduced as a series of dots arranged in accordance with a predetermined format. One common commercial format, usually referred to as the 5×7 format, comprises seven horizontally extending rows of dots in five vertical columns. Usually, three blank columns are left between individual characters. Another common format is a 7×9 dot array. With either format, all capital letters, all numerals, most lower case letters, and many forms of punctuation can be readily and effectively reproduced in highly readable form.

There are a variety of other characters, however, that produce substantial technical problems in dot matrix printers. These are the lower case letters p, j, y, q, and g, having descender elements that project below the base line of a line of type. In this same category are some punctuation marks such as commas and semicolons, subscripts, and, in some instances, portions of fractions. For these characters, referred to herein as "descender characters," the usual vertical array of print dot positions in a standard character format is inadequate because there are no print elements available to print dots below the base line.

It has been common practice, in dot matrix printers, to print the descender characters completely above the horizontal base print line. This results in an appearance that does not conform to ordinary practice and is unsatisfactory in many applications, particularly where appearance and ease of readability are required.

Another known technique for printing descender characters entails the addition of two or more print rods to the printer, located below the vertical array used for printing the standard format. This construction materially increases the weight and inertia of the print head, which are already critical factors in a high speed printer. In addition, the cost of the print head is substantially increased, because the print rods, print rod guides, and print rod actuating magnets, particularly in high speed printers, are precision mechanisms for which the cost is quite appreciable. Examples of dot matrix printers that provide additional print rods for printing descender characters are shown in U.S. Pat. Nos. 3,426,880 and 3,627,096.

Another arrangement for printing descender characters in a dot matrix printer, one that does not use additional print rods for printing below the normal base line, is shown in U.S. Pat. No. 3,759,359. In that device, the print head is pivoted downwardly to print each descender character, the downward movement of the print head being equal to the height of two printed dots. This arrangement is useful only if the printer has a large diameter platen. Otherwise, the displacement of the print head from the normal position for printing above the base line to the position in which descender elements are printed below the base line changes the relative spacing between the tip ends of the print rods and the platen surface, so that the top print rods are located much closer to the platen surface than the bottom print rods. Thus, in a printer having a platen of small diameter, this construction results in a substantial degradation of print quality for the bottom portions of descender characters or in puncturing of the paper for the upper dots in such characters. Further, the cost of the precision print head is again increased.

For printers that operate at relatively low print rates, such as the standard telex rate of six characters per second, a large platen may not be particularly disadvantageous. For higher speeds, however, a large diameter platen introduces rather severe problems. The inherently greater weight required for a large platen imposes a requirement for higher torque on the line feed mechanism of the printer. The greater inertia of a large platen may result in an undesirable lengthening of the time required for the line feed operation. The rapid movement of the platen necessary to advance the paper from a masked position behind a ribbon or other masking portion or the printing to a viewing position, as in the text display control described and claimed in U.S. Pat. No. 3,844,395, makes a large diameter platen quite undesirable. Moreover, a large platen inherently increases the overall size of the printer, which is quite undesirable in many applications.

SUMMARY OF THE INVENTION

It is a principal object of the invention, therefore, to provide a new and improved descending printing system for a dot matrix printer that effectively and inherently eliminates or minimizes the substantial technical problems of previously known systems as described above.

A specific object of the invention is to provide a new, improved, and practical descender printing system for a high speed dot matrix printer, using a small diameter platen, with no additional print rods over and above the number required for printing in a standardized format.

Another object of the invention is to provide a new and improved descender printing system for a high speed dot matrix printer that requires no modification of the print head.

A particular object of the invention is to provide a new and improved descender printing system for a high speed dot matrix printer in which the print head and paper are re-aligned vertically for printing each descender character by movement of the paper, with no vertical movement of the print head.

Accordingly, the invention relates to a dot matrix printer of the kind comprising a print head, including a plurality of print elements disposed in a vertical arcuate array, for printing characters on a record sheet supported upon a cylindrical platen in a format $m \times n$ of $m$ horizontal column increments and $n$ vertical row increments, a carriage for moving the print head across the record sheet in a horizontal printing direction with the lowermost printing element normally aligned with a horizontal base print line on the record sheet, and control means, including a FIFO input store, for actuating the print elements and the carriage in response to a received signal including a series of code words representative of characters to be printed and of other functions of the printer. The improvement of the invention comprises descender decoding means, coupled to the input store, for decoding code words representative of descender characters that include descender components to be located below the base print line, prior to printing of such descender characters, and descender shift means, coupled to the descender decoder means, for shifting the record sheet upwardly through a distance L equal to $p$ row increments, from a normal print position to a descender print position, aligning $p$ print elements below the base print line for printing each descender character, where $p > n$. Shift reset means are included in the descender shift means, for shifting the record sheet downwardly through distance L from the descender print position to the normal print position, after completion of printing of a descender character, to permit printing a subsequent character entirely above the base line.

BRIEF DESCRIPTION OF THE DRAWINGS

FIG. 5 is a block diagram of a preferred embodiment of the present invention.

DESCRIPTION OF THE PREFERRED EMBODIMENTS

Figure 1:
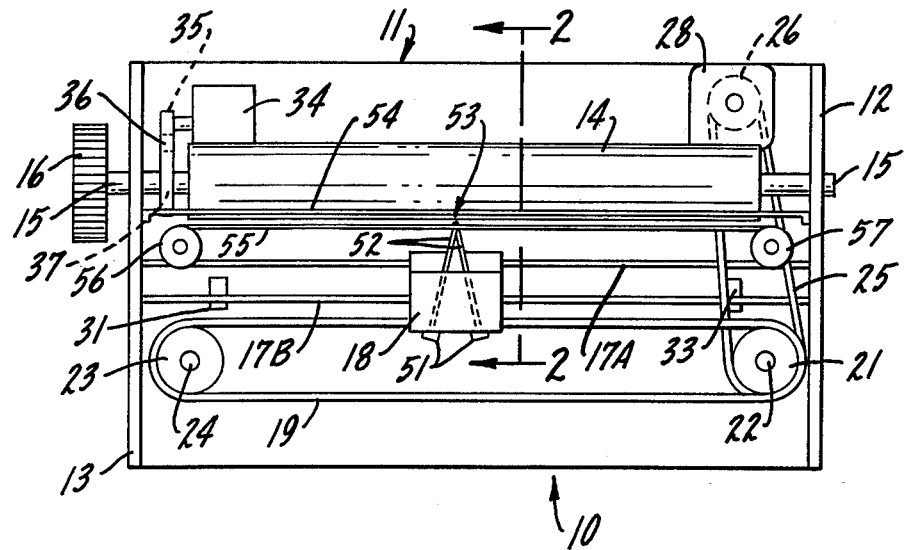
FIG. 1 is a simplified plan view of a high speed dot matrix printer of a kind in which the descender printing system of the present invention may be incorporated to particular advantage.
Figure 2:
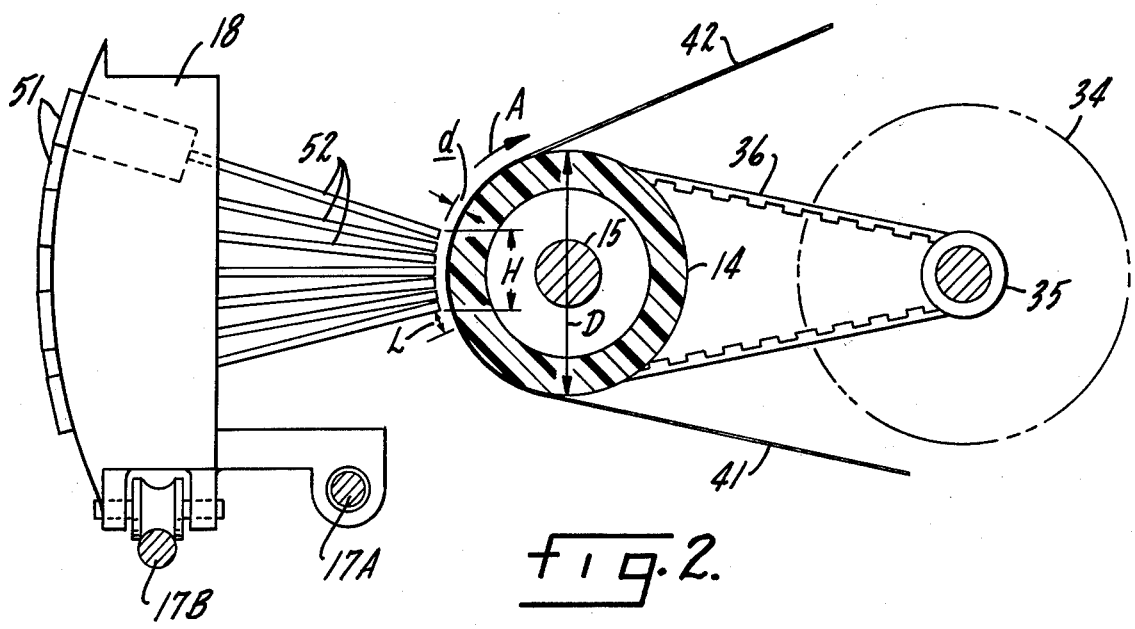
FIG. 2 is a detail sectional elevation view of a part of the printer taken approximately along line 2—2 in FIG. 1.

FIGS. 1 and 2 illustrate a high speed dot matrix printer 10 in which the descender character printing system of the present invention can be employed to substantial advantage; printer 10 produces characters in the dot matrix forms illustrated in FIGS. 3A–3K. Printer 10 comprises a base 11 with two vertical frame members 12 and 13 affixed to its opposite sides. A platen 14 is mounted upon a rotatable shaft 15 that extends between the two side frame members 12 and 13. A knob 16 is mounted on one end of shaft 15 to provide for manual rotation of platen 14.

Two carriage guide rails 17A and 17B are mounted at the front of printer 10, extending transversely of the printer between frame members 12 and 13, parallel to platen 14. A print head carriage 18 is slidably mounted on guide rails 17A and 17B and is connected to the ends of a carriage positioning belt 19. Preferably, belt 19 is a toothed belt of the kind known as a timing belt. The right hand side of belt 19 extends around a drive sprocket 21 mounted upon a shaft 22 that projects upwardly from the printer base 11. The opposite side of belt 19 engages another sprocket 23 mounted upon a vertical shaft 24 at the left hand side of base 11.

The sprocket shaft 22 is connected to a pulley (not shown) that is engaged by a drive belt 25. Drive belt 25 extends around a drive sprocket 26 mounted upon the shaft of a reversible stepping motor 28 used as a carriage drive motor. The carriage drive motor 28 is a reversible motor that rotates through a discrete angle each time an electrical signal pulse is applied to the motor windings. Printer 10 may include two margin control switches 31 and 33 mounted on base 11 in position to be actuated by carriage 18 (FIG. 2). Switch 31 is located at the left-hand side of printer 10 and switch 33 is located at the right-hand side of the printer.

Printer 10 also includes a line feed motor 34 mounted in the rear left-hand corner of base 11. Motor 34 is a reversible stepping motor similar to the carriage drive motor 28. A drive connection is provided between motor 34 and platen 14, comprising a drive sprocket 35 mounted on the output shaft of motor 34 in engagement with a belt 36 that also engages a driven sprocket 37 mounted on platen shaft 15.

A roll of paper record sheet material 41 is mounted at the rear of the printer 10 (not shown). The paper record sheet 41 extends around the platen 14 as shown in FIG. 2, and under a bail bar 54 (FIG. 1) that maintains the paper in contact with the platen. The portion 42 of the record sheet 41 that projects upwardly from platen 14 (FIG. 2) is the portion on which data has previously been recorded by the printer.

A plurality of print head magnets 51 are mounted upon the print head carriage 18 (FIGS. 1 and 2). In one typical construction, a total of seven print head magnets 51 are employed, as shown in U.S. Pat. No. 3,729,079. Each of the print head magnets 51 affords a drive means for axial movement of an individual print rod 52.

The ends of the print rods 52 terminate in a vertical arcuate array spaced a small, uniform distance $d$ from platen 14 (FIG. 2) at a printing station 53 (FIG. 1) that traverses the platen longitudinally as the print head carriage 18 moves along the guide rails as described hereinafter.

It will be recognized that details of a number of the mechanical linkages in printer 10 have been omitted as unnecessary for an understanding of the present invention; these may include a return spring for the return of print head carriage 18 to the left-hand margin of the printer and a clutch to release the carriage drive for a carriage return movement. The preferred construction for carriage 18, magnets 51, and print rods 52 is illustrated in detail in U.S. Pat. No. 3,729,965.

Impact-sensitive paper may be utilized as the recording sheet 41 in printer 10. On the other hand, in many applications this relatively expensive paper may not be desirable. For such applications, printer 10 may be equipped with a ribbon 55 that extends through printing station 53 (FIG. 1) between platen 14 and the tip ends of print rods 52. The ends of ribbons 55 are taken up on two spools 56 and 57. If a ribbon is employed, an appropriate mechanism for advancing ribbon 55 to present fresh lengths of the ribbon for successive imprints is incorporated in printer 10, but has not been shown in the drawings.

The basic construction for printer 10, as described above, is already known in the art, so that only a brief description of the mechanical operation of the printer is necessary in this specification. Before printer 10 is placed in operation, as noted above, the paper record sheet 41 is extended around platen 14, between the platen and the outer ends of the print rods 52. The starting position for the print head carriage 18 is at the left-hand end of its travel on rails 17A, 17B, near the left-hand margin switch 31. For the first character to be imprinted, such as the character "P" in FIG. 3A, carriage 18 advances a given number of discrete steps from left to right, the carriage being driven by its positioning belt 19 through the drive afforded by motor 28, drive belt 25, and sprocket 21. In the illustrated embodiment, eight discrete steps are used for each character. During the first three steps or incremental column movements of carriage 18, no impression is made on paper 41. In the next five steps of the carriage, a complete character is imprinted by selective actuation of print rods 52. Of course, a different format could be employed, depending upon the requirements of the symbols to be printed and other factors not critical to the present invention.

Figures 3A, 3B, 3C, 3D, 3E, 3F, 3G, 3H, 3I, 3J, 3K:
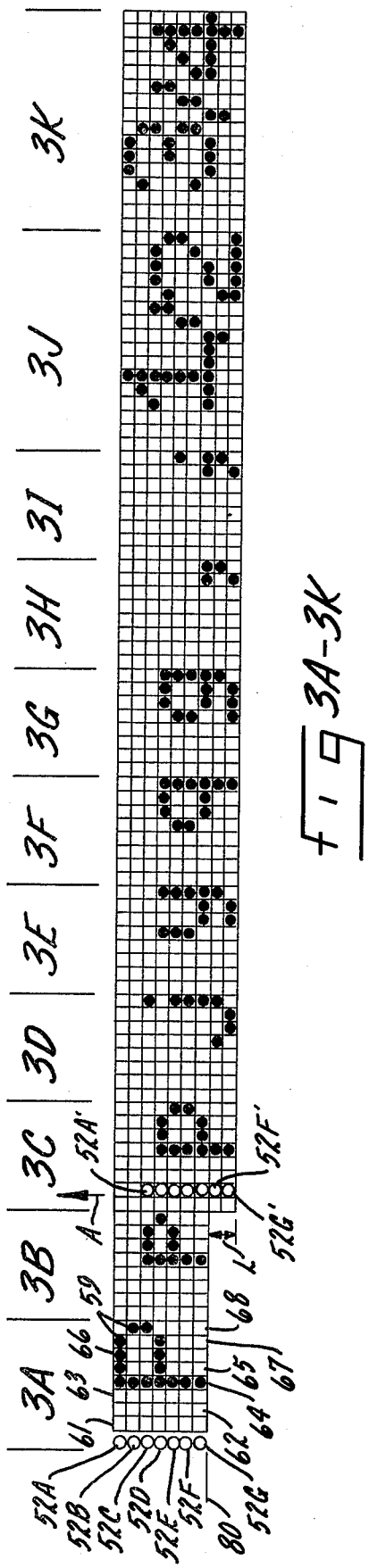
FIGS. 3A through 3K illustrate a number of different characters, mostly descender characters, printed by the printer of FIGS. 1 and 2.

As shown in FIG. 3A, the initial advancing movement of carrage 18 leaves three blank columns 61, 62 and 63 preceding the first printed character. In the next column 64, all seven of the print rods 52 (shown at positions 52A-52G in FIG. 3A) are driven into impact with the record sheet, producing seven vertical dot impressions 59. On the next incremental step 65 in the advancing movement of carriage 18, only two dot impressions 59 are formed, one by print element 52A and the other by print rod 52D. This action is repeated in the next two columns 66 and 67. In the eighth step for carriage 18, the print rods 52B and 52C are actuated, producing dot impressions in the final column 68. This results in the formation of the letter P as illustrated in FIG. 3A. In this same manner, a complete line of data symbols (letters, numbers, or other symbols) is imprinted across the paper record sheet 41 on platen 14, with carriage 18 moving from left to right (FIG. 1) a total of eight steps for each individual symbol.

FIGS. 3B through 3K illustrate additional characters and symbols that printer 10 may be required to reproduce. FIG. 3B illustrates the lower case letter p as it would be reproduced by known printers having no provision for printing descender elements below the horizontal print base line 80. This letter, in the form shown in FIG. 3B, is not always recognizable, in a rapid scan, because it is not located in the usual position. Descender characters printed in the manner illustrated by FIG. 3B thus degrade the readability of the printed data.

FIGS. 3C through 3K illustrate various descender characters as printed by printer 10 when equipped with the descender printing system of the present invention. To print these characters, the paper 41 (FIG. 2) is advanced in the direction of the arrows A (FIGS. 2 and 3C) to realign the paper with the print head, so that the print elements 52 occupy the vertical positions 52A'λ -52G' as shown in FIG. 3C. With this realignment for descender printing, the base line 80 on paper 41 is raised above the print rods at positions 52F' and 52G'. This makes possible the printing of all of the descender characters (FIGS. 3C-3K) with no need for additional print elements in printer 10. The descender printing system is described in greater detail hereinafter.

At the end of any complete movement of eight column increments for carriage 18, whether or not that movement includes printing of a data symbol, the carriage may be returned to the left-hand limit of its travel to begin the printing of a new line of text on the paper 41. The carriage return operation may be initiated by a carriage return code word in an input signal to control printer 10, or by engagement of carriage 18 with the right hand limit switch 33. That is, switch 33 can be employed to actuate the carriage return and line feed mechanisms of printer 10 on a mandatory basis to return the carriage to the initial left-hand position for the beginning of a new line and to feed the paper web 41 around platen 14. Before printing of a new line of text is initiated, the line feed drive motor 34 rotates platen 14 through a number of incremental steps, by means of the drive connection 35-37, aligning a fresh line segment of the record sheet 41 with carriage 18. Other non-print function codes may be included in the received signal to control other printer operations.

Figure 4:
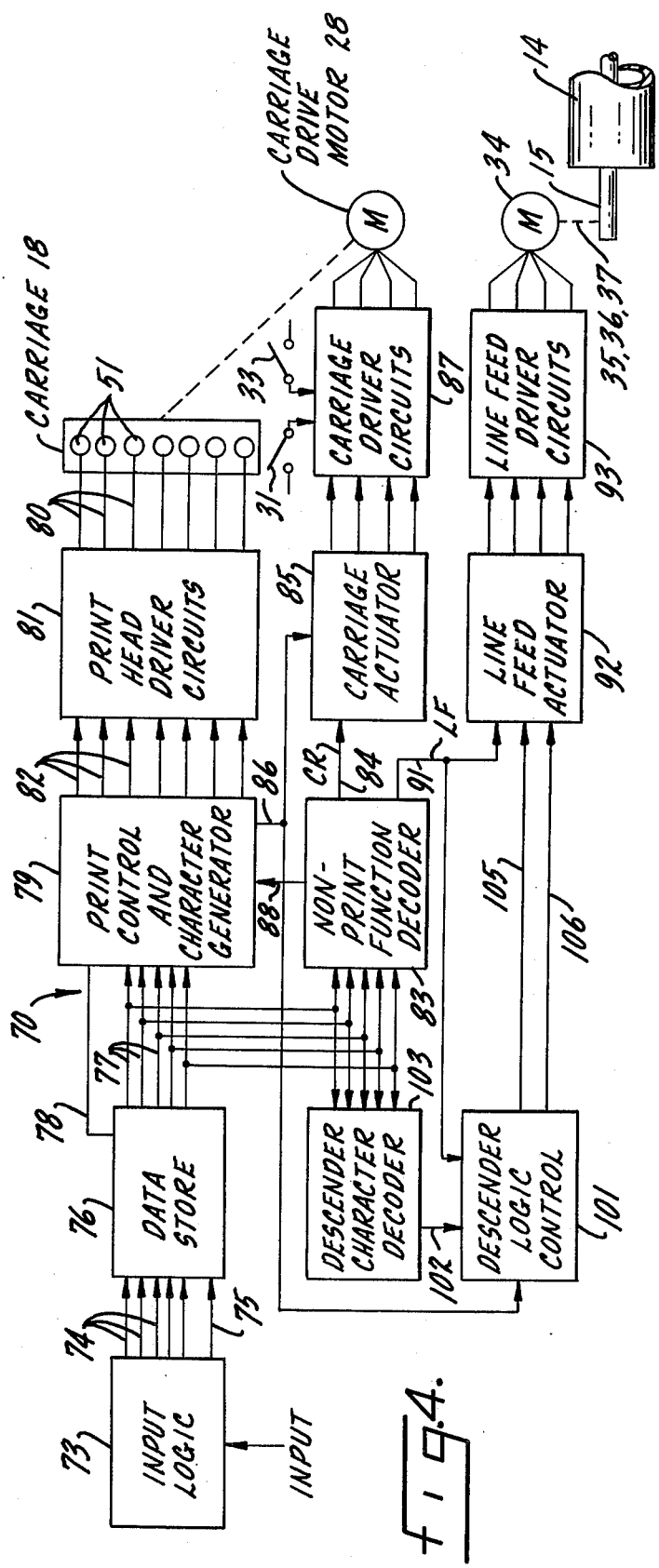
FIG. 4 is a block diagram of a control system for the printer of FIGS. 1 and 2, incorporating the control elements of a descender printing system constructed in accordance with one embodiment of the present invention.

FIG. 4 is a block diagram of a basic control system 70 for printer 10. The input stage of control system 70 comprises an input logic circuit 73 to which an input signal is supplied, either from a keyboard or from an input transmission line. The output of logic circuit 73 comprises a series of data output circuits 74 and a load signal circuit 75, all coupled to the input level of an input data store 76. Data store 76 could be constructed with a single storage level for recording just one code word representative of a single data symbol or of a single non-print function for the printer. Preferably, however, data store 76 includes a plurality of storage levels, capable of recording a substantial number of code words.

The output of data store 76 is coupled, by a plurality of data output circuits 77, to the input of a print control and character generator unit 79. A print clock control connection 78 is also provided, between data store 76 and the input of the print control-character generator unit 79, to afford a means for inter-relating the timing of unit 79 operations with those in data store 76. There are seven output circuits 82 from unit 79 to a print head driver circuit unit 81. The print head driver circuits 81, in turn, include an equal number of output circuits 80, individually connected to the print head magnets 51 of carriage 18.

The printer control system 70, FIG. 4, also includes appropriate non-print function detector circuits incorporated in a decoder circuit unit 83. Each of the outputs 77 from data store 76 is connected to an input for function decoder 83. Decoder 83 has a carriage return output circuit 84 that is connected to the input of a carriage actuator unit 85. The carriage actuator unit 85 also receives a step signal input from the print control and character generator unit 79, through a circuit 86. Carriage actuator unit 85 has four outputs that are coupled to a set of carriage driver circuits 87, in turn coupled to the carriage drive motor 28. The left-hand switch 31 and the right-hand switch 33, if present, are also connected to the carriage driver circuits 87.

A line feed output 91 from the non-print function decoder unit 83 is connected to the input of a line feed actuator 92. Actuator 92 has four output circuits, connected through line feed driver circuits 93 to the line feed drive motor 34.

Printer control 70, as thus far described, is generally conventional in construction and organization. An input signal including a sequence of code words representative both of symbols to be printed and of non-print functions for printer 10 (FIGS. 1,2) is applied to the input logic circuit 73 (FIG. 4). The source of the input signal may be either a keyboard or a transmission line. Input logic circuit 73 detects the proper start-stop sequence of the encoded data and converts the data from serial to parallel form. For each received code work, a plurality of parallel output signal pulses and a load pulse are applied to the input of data store 76 to record the code word in the data store. No other external operating signals are required for the input logic 73 in normal operation of system 70.

Data store 76 records each code work as received; the data store may be a conventional shift register memory with internal transfer between sequential storage levels, or a conventional RAM device. In either case, it functions as a FIFO storage unit.

At the beginning of each print cycle, a print clock control signal is developed, and is applied to the print control logic circuits in unit 79 to activate internal timing logic that applies a column count signal to the integral character generator. The same print timing arrangement supplies a step timing signal to the carriage actuator 85, through circuit 86. For a non-print code word, identified by the decoder circuits 83, the character generator in unit 79 is inhibited by an appropriate signal supplied thereto through circuit 88.

Prior to each cycle of the printer, the next code word in data store 76 is sampled by the decoder circuits in unit 83. In this manner, carriage return and line feed codes are detected, producing suitable control signals supplied to carriage actuator 85 and line feed actuator 92 for control of these printer operations. The inputs to the carriage driver circuits 87 from the carriage position sensing switches 31 and 33 are utilized for internal logic resetting functions. Thus, the basic operation of control system 70 is essentially similar to the system described in detail in U.S. Pat. NO. 3,719,781, to which reference may be made for further details of a practical printer control system.

Control system 70, however, incorporates a descender control logic unit 101 having a number of different inputs. One input is the step signal, on line 86, from print control 79. Another input 102 to the descender control logic 101 is derived from a descender character decoder 103 coupled to the output of data store 76. Another input may be the line feed signal on line 91, derived from the non-print function decoder unit 83; the normal line feed connection of line 91 to actuator 92 may be omitted. Additional inputs to logic unit 101 may be provided from other parts of the overall control system 70, depending upon the specific circuits utilized in the overall printer control. Descender control 101 further includes two output circuits 105 and 106 connected to line feed actuator 92. Additional outputs for logic unit 101 may also be required. The output connections 105 and 106 are employed to supply a descender positioning signal and a reset signal to the record sheet shift means comprising line feed actuator 92, driving circuits 93, line feed drive motor 34, and the mechanical linkage 35-37 to the platen 14.

In operation, whenever a code word for a descender character is stored in the output of data store 76, this condition is detected by the descender detector 103, and an output signal is applied to control 101 on line 102. Control 101 supplies a descender positioning signal to line feed actuator 92 to actuate the line feed driver circuits 93 and energize line feed drive motor 34. Motor 34, through the drive connection 35-37, rotates platen 14 through one or more increments of movement, thereby advancing record sheet 41 vertically to a position at which lowermost print elements 52 are below the base line 80 (FIG. 3C). In a typical system, the paper record sheet 41 is advanced by a distance L precisely equal to the total height of two of the printing row increments represented by the dots 59. This applies to a 5 × 7 matrix format as shown in FIGS. 3A-3K. For any matrix of $n$ vertical printing elements, printing in a format of $m \times n$, where $m$ is the number of column increments, the distance L is equal to $p$ vertical row increments, and $p$ is substantially smaller than $n$. With a 7 × 9 format it may be desirable to shift paper 41 through a vertical distance L equal to the height of three print dots to achieve the best proportions between descender and non-descender characters. Thus, $n = 9$ and $m = 7$; for this format $p = 3$.

Subsequently, when printing of a descender character is complete, a reset signal is generated in control unit 101 and supplied to line feed actuator 92 to again actuate the record sheet shift mechanism and move the record sheet 41 back into its original printing position for printing of the next character in the text. Reset may be triggered by the step signal (line 86) for the next character. Of course, reset should not be effected if the next character is a descender character; in such circumstance, the reset is precluded by a new descender character identification signal from decoder 103. In this manner, the text continuity is maintained and the format of the printed text is preserved as shown in FIGS. 3C-3K.

As will be apparent from the foregoing description, the addition of the descender printing system comprising logic control unit 101 and its connections to control system 70 (FIG. 4) does not interfere with normal continuous operation of the printer and does not inhibit the speed of continuous operation, provided platen 14 can be rapidly shifted to move paper 41 to and from the position required to print the descender characters (FIGS. 3C-3K). With a large platen, however, this requirement becomes difficult or even impossible to achieve in an economically feasible printer. Platen 14 should be small in diameter and light in weight to allow motor 34 to shift the platen between its descender and non-descender printing positions within less than three and preferably less than one column step interval. For a 10-character-per-second machine, using a 5 × 7 format with eight columns per character, as shown, this is a shift interval $t$ of 0.0125 second or less. For a 30 cps printer, the shift interval is preferably 0.00417 second or less.

Of course, the diameter of platen 14 cannot be reduced indefinitely; the platen diameter D must exceed the overall height H of the dot matrix format (see FIG. 2). A good working relation, keeping the platen diameter to a minimum size, is to maintain $$6H > D > 2H.$$

With the descender printing system of the invention, there is no distortion or disturbance in the printed text and the control is fully automatic, requiring no mechanical changes in the printer. The logic unit 101 can be fully constructed from solid state circuitry, and hence is quite capable of long-term operation with little or no special maintenance or expense, and is relatively simple and economic in construction.

For some composite characters, such as the fractions shown in FIGS. 3J and 3K, a part of the character may appear in the uppermost rows of the standard format and a part may extend into the bottom rows of the descender format. These composite characters can be printed accurately if the transition time between normal and descender printing positions, for record sheet 41, is made substantially less than the time required to advance the platen horizontally by one column increment, since the actual printing stroke of the print rods 52 is only a minor fraction of the total column time. Of course, the characters must be limited to dots, in each column, in only as many adjacent vertical row positions as there are print rods 52.

Specific circuitry to implement the addition of descender control 101 and descender decoder 103 to control system 70 may be relatively simple. Decoder 103 is a conventional circuit constructed to identify those received code words representative of the descender characters and to supply appropriate identification signals to control 101. A series of AND gates and NOR gates, appropriate to the transmission code, will suffice.

Control 101 may be constructed in TTL logic in a manner essentially similar to the logic circuits disclosed in the text display system of U.S. Pat. No. 3,844,395, making due allowance for different input signals and for the necessity for rapid actuation of the platen through a small distance instead of the delayed actuation through a much larger distance as provided in that patent. The next display of U.S. Pat. No. 3,844,395 and the descender printing system of the present invention can be readily combined in a given printer.

FIG. 5 illustrates, in block diagram form, a general printer control system 150 incorporating a preferred embodiment of the present invention. The transmission line input stage 73' of system 150 includes a line interface circuit 151 to which a telegraph input signal is supplied on line 152. The input signal may be encoded in accordance with the standard eleven-unit ASCII code or the conventional 7½ unit Baudot code; other permutation codes can be employed with appropriate modifications in the control system to interpret the code.

The output of line relay 151 is connected to a universal asynchronous receive/transmit (UART) input-output logic circuit 153. For example, UART circuit 153 may comprise a MOS/LSI unit as manufactured by SMC Microsystems Corporation, Model COM2502/H or COM2017/H, suitably programmed for data word length, parity mode and number of stop bits to conform to the requirements of the data input signal supplied from line 152 through interface circuit 151. A basic timing signal is supplied to the UART circuit 153 from a crystal-controlled oscillator 154. The UART device 153 has a data output connection 155 to a main control logic unit 157; there is also a control output 156 from the main control logic unit back to UART device 153. Unit 157 comprises a miniprocessor or microcomputer as a central processing unit (CPU), with suitable auxiliary circuits such as an input multiplexer and output registers, programmed to carry out the descender print control operations of the present invention as well as the many other functions necessary to control printer 10.

The main logic unit 157 has output and input connections 158 and 159 to a character generator 161. Character generator 161 may be of conventional construction; for example, the character generator may comprise two type 8316 read-only memory (ROM) devices programmed in accordance with the desired type font and input data code. There is also a local data input circuit 162 to logic unit 157 from a keyboard 163, for local operation of printer 10 and for transmission-mode operation of the printer.

Control system 150 includes a first-in first-out (FIFO) input storage register 76. Storage register 76 has an input connection 165 from logic unit 157 and an output circuit 166 back to the main logic unit. A conventional shift register may be employed for device 76; as illustrated, however, storage register 76 is a random access memory (RAM) programmed for FIFO operation. By way of example, storage register 76 may comprise two type 2112 RAM devices.

The main logic unit 157 has an output 168 to a single-column storage register 167 in turn connected to the print head driver circuits 81. Store 167 affords seven output circuits, one for each of the printing rods 52 of printer 10 (FIG. 1); each output is individually connected to one of seven print magnet driver circuits in unit 81. Each print magnet driver circuit is connected to an individual magnet or solenoid 51 for actuating one of the print rods 52 (see FIG. 1).

Another output 173 from the main control logic unit 157 extends to a stepper motor store 174. The store 174 includes a carriage motor storage register connected by an output 175 to the carriage motor driver circuits 87 and a line feed storage register connected by an output 177 to the line feed motor driver circuits 93. The carriage motor driver unit 87 has four outputs individually connected to four motor windings in the carriage drive step motor 28. Signals from driver unit 87 to motor 28 determine the direction of rotation of the motor and control the number of steps through which the carriage drive motor is driven in any given operational sequence. Similarly, four outputs from the line feed motor driver unit 93 to line feed motor 34 supply actuating signals to the line feed motor to drive shaft 15 and platen 14, clockwise or counterclockwise, through ordinary line feed operations, descender print operations, and any other operations requiring platen rotation.

In considering the general operation of control system 150, it may first be assumed that printer 10 is being operated as a receiver responsive to an input signal supplied to the UART circuit 153 from line 152 through interface circuit 151. In the UART circuit, each received code word is converted from series to parallel form and transmitted to the main control logic unit 157 as generally indicated by line 155. The overall synchronization of operations in control system 150 is effected by clock signals from oscillator 154.

The main logic control unit 157 records the received data in the input storage register 164. The recorded code words are read from RAM 164 by the main control logic unit 157 and supplied to character generator 161, which interprets each code word with respect to machine function and supplies machine control signals back to the main control logic unit. ROM 161 also stores the program for the miniprocessor of logic unit 157. For the printing of any individual character, print magnet control signals based on the signals from character generator 161 are supplied by the main control logic 157 to store 167, in the appropriate sequence, and then applied to the print magnet drivers 81 for selective energization of the print magnets 51. Stepping of the print head 18 through the required sequence of column steps for reproduction of each character is effected by stepping signals supplied to store 174 from logic unit 157 and applied to motor 28 through the carriage motor driver unit 87.

Whenever a code work for a descender character is read from RAM 76 and decoded in character generator 161, appropriate signals are supplied from the main logic unit 157 to stepper motor store to actuate line feed driver unit 93 and cause motor 34 to step platen 14 and shift the record sheet 42 upwardly a distance L of p row increments (FIG. 2). Thus, for printing a descender character, the record sheet in the printer is shifted to the descender print position (see FIG. 3C). If the next code word decoded in character generator 161 is another descender character, the platen and record sheet remain in the descender print position. If the next code word is a regular character (not a descender character), in the next print cycle the record sheet 42 is shifted back downwardly through distance L (FIGS. 2,3) from the descender print position to the normal print position. The descender decoder 103 and descender logic control 101 of FIG. 4 are thus incorporated in the main logic control unit 157 in the preferred embodiment of FIG. 5.

For a detailed disclosure of suitable operating circuits for the miniprocessor embodiment of FIG. 5, including an operating program for logic unit 157, reference may be made to the comprehensive disclosure in co-pending application Ser. No. 624,054 filed Oct. 20, 1975. In that disclosure, the miniprocessor for logic unit 157 comprises a type 8008 CPU; other miniprocessor devices, such as the type 8080, can also be employed.

For operation of printer 10 with control system 150 as a transmitter, an input signal is supplied from keyboard 163 to the main control logic unit 157. Operation of the printer proceeds in the same manner as described above: the code words of the input signal are recorded sequentially in RAM 76 and read out in the same sequence for printer actuation. The signals from keyboard 163 are also supplied from logic unit 157 to UART 153 and from UART 153 to a transmission line 181 through a relay transmitrer circuit 182.

The descender printing system of the invention often requires no modification of the mechanical portion of the printer, in a machine having a small, low-inertia platen and having a reversible stepping motor or like reversible drive used for line feed. The drive ratio between the line feed motor and the platen may require some adjustment to assure movement of platen 14 through the desired distance L in an integral number of steps of motor 34, but this can be readily accomplished by appropriate selection of sprockets 35 and 37. The descender printing system has been successfully applied to printers operating at print rates well above 30 cps with clear, sharp copy resulting. Although described in connection with a printer using mechanical impact print elements (rods 52), the method and control apparatus of the invention may also be utilized in a printer employing thermal printing elements.

We claim:

1. In a dot matrix printer of the kind comprising a print head, including a plurality of print elements disposed in a vertical array, for printing characters on a record sheet supported upon a platen in a format $m \times n$ of $m$ horizontal column increments and $n$ vertical row increments, a carriage for moving the print head across the record sheet in a horizontal printing direction with the lowermost printing element normally aligned with a horizontal base print line on the record sheet, and control means, including a FIFO input store, for actuating the print elements and the carriage in response to a received signal including a series of code words representative of characters to be printed and of other functions of the printer, the improvement comprising:

descender decoder means for decoding code words representative of descender characters that include descender components to be located below the base print line, prior to printing;

descender shift means, coupled to the descender decoder means, for shifting the record sheet upwardly through a distance L equal to $p$ row increments, from a normal print position to a descender print position, thereby aligning $p$ print elements below the base print line for printing each descender character, where $p < n$;

and shift reset means, included in the descender shift means, for shifting the record sheet downwardly through distance L from the descender print position to the normal print position, after completion of printing of a descender character, to permit printing a subsequent character entirely above the base line.

2. A dot matrix printer, according to claim 1, including a line feed mechanism for advancing the record sheet upwardly by a given integral number of line feed increments to present a fresh line segment of the record sheet for recording a new line, in which the descender shift means is coupled to the line feed mechanism, and in which the distance L is equal to an integral number of line feed increments substantially smaller than the number of increments employed for a line feed movement.

3. A dot matrix printer according to claim 2 in which the line feed mechanism comprises a reversible stepping motor.

4. A dot matrix printer according to claim 1 in which the platen diameter D is within the range $$6H > D > 2H,$$

where $H$ is the overall height of the printing element array.

5. A dot matrix printer according to claim 4 in which there are just $n$ print elements, in which the carriage moves through a plurality of column steps in printing each character, and in which the transition time between the normal and descender print positions is substantially less than the time required to move the platen horizontally by one column step.

6. The method of printing, utilizing a dot matrix printer of the kind comprising a print head including a plurality of print elements disposed in a vertical array, for printing characters on a record sheet supported upon a cylindrical platen in a format $m \times n$ of $m$ column increments and $n$ row increments, a carriage for moving the print head across the record sheet in a horizontal printing direction with the lowermost printing element normally aligned with a horizontal base print line on the record sheet, and control means, including a FIFO input store, for actuating the print elements and the carriage in response to a received signal including a series of code words representative of characters to be printed and of other functions of the printer, comprising the following steps:

A. monitoring the code words to detect each code word representative of a descender character that includes a descender component to be located below the base print line, prior to printing;

B. shifting the record sheet upwardly through a distance L equal to $p$ row increments, from a normal print position to a descender print position, to align $p$ print elements of the print head below the base print line for printing each descender character, where $p < n$; and C. shifting the record sheet downwardly through distance L from the descender print position to the normal print position, after completion of printing of a descender character, to permit printing a subsequent character entirely above the base line.

7. The method of printing, according to claim 6, utilizing a printer which includes a line feed mechanism connected to the platen and a line feed actuator for controlling actuation of the line feed mechanism, for advancing the record sheet upwardly by a given integral number of line feed increments to present a fresh line segment of the record sheet for recording a new line, in which the line feed mechanism is employed to perform steps B and C, and in which the distance L is equal to an integral number of line feed increments.

* * * * *